(No Model.)
J. J. HICKS.
CLINICAL THERMOMETER.
No. 280,037. Patented June 26, 1883.
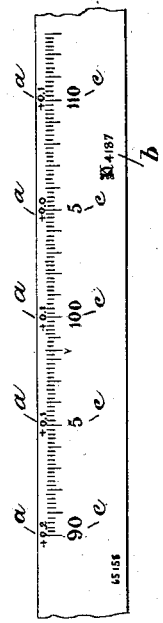
Attest:
L. W. Hopkins.
H. E. Knight
Inventor:
James Joseph Hicks
By Knight Bros.
attys.

UNITED STATES PATENT OFFICE.

JAMES J. HICKS, OF HATTON GARDEN, COUNTY OF MIDDLESEX, ENGLAND.

CLINICAL THERMOMETER.

SPECIFICATION forming part of Letters Patent No. 280,037, dated June 26, 1883.

Application filed January 18, 1882. (No model.)

*To all whom it may concern:*

Be it known that I, JAMES JOSEPH HICKS, a subject of the Queen of Great Britain, residing at Hatton Garden, in the county of Middlesex, England, meteorological-instrument manufacturer, have invented certain new and useful Improvements in Thermometers, of which the following is a specification.

My invention relates to that class of thermometers which has the scale etched on the tube thereof.

When thermometers are examined by comparison with a standard instrument, it is almost invariably the case that some slight errors are found to exist in the scale, and these errors are set down on a certificate which is supplied with the thermometer, and which is numbered and marked in accordance with the numbers and marks on the thermometer to insure identity therewith. Now, when the thermometer is used and an exact reading is desired, the certificate, or a copy thereof which may have been entered in a book, has to be consulted and the errors added to or subtracted from the observed scale-reading. This is a troublesome operation, as it involves reference to the certificate of correction or to a copy thereof, which possibly may not at the time be within reach or may be lost. I obviate this difficulty by etching or otherwise marking the errors on the thermometer-tube itself, as shown by the accompanying drawing, which represents the surface of a thermometer-tube opened out flat, and shows the scale and number usually applied thereto, and the corrections to be made in the scale-readings, together with the Kew Observatory monogram and number $b$. The lower figures, $c$, 90—5, 100—5, and 110, with the scale, are, as usual, etched or otherwise marked on the thermometer-tube before its examination with the standard instrument. Then, after the instrument has been examined, the corrections $a$, which, in the example shown in the drawing, are $+0.2$ at 90, $+0.1$ at 95, $+0.1$ at 100, $+0.0$ at 105, and $+0.1$ at 110. In this case all the corrections are in the shape of additions; but in some cases they are in the form of subtractions when the sign indicating minus is employed. The Kew Observatory monogram and number are "K. O. 4 187;" but the number and monogram or other sign of any other examination-office at which the thermometer has been compared with the standard instrument may be applied to the thermometer in lieu thereof. By these means the thermometer carries with it the corrections found to be necessary, thereby greatly enhancing its utility, as the correct reading can be at once obtained by reference to the thermometer alone.

Having thus described my invention, the following is what I claim as new therein and desire to secure by Letters Patent:

1. A clinical thermometer having, in combination with the scale and ordinary figures etched or otherwise marked thereon, the corrections of the examining-office, substantially as shown and described.

2. A thermometer-tube having the corrections of the examining-office marked thereon, in addition to the ordinary scale-readings, as set forth.

JAS. J. HICKS.

Witnesses:
ALFRED H. JONES,
C. M. WHITE.